(12) United States Patent
McCarthy et al.

(10) Patent No.: US 10,661,719 B2
(45) Date of Patent: May 26, 2020

(54) VEHICLE INTERIOR COMPONET

(71) Applicant: Shanghai Yanfeng Jinqiao Automotive Trim Systems Co. Ltd., Novi, MI (US)

(72) Inventors: David John McCarthy, Holland, MI (US); Randal John Vanhoof, Zeeland, MI (US); Jon William Bornfleth, Zeeland, MI (US); Jiunn Tyng Chen, Holland, MI (US)

(73) Assignee: Shanghai Yanfeng Jinqiao Automotive Trim Systems Co. Ltd., Novi, MI (US)

( * ) Notice: Subject to any disclaimer, the term of this patent is extended or adjusted under 35 U.S.C. 154(b) by 174 days.

(21) Appl. No.: 16/109,240

(22) Filed: Aug. 22, 2018

(65) Prior Publication Data

US 2018/0361942 A1  Dec. 20, 2018

Related U.S. Application Data

(63) Continuation of application No. PCT/US2018/012056, filed on Jan. 2, 2018.
(Continued)

(51) Int. Cl.
*B60R 7/06* (2006.01)
*B60N 3/08* (2006.01)
(Continued)

(52) U.S. Cl.
CPC ............... *B60R 7/06* (2013.01); *B60K 37/04* (2013.01); *B60N 3/08* (2013.01); *B60N 3/102* (2013.01)

(58) Field of Classification Search
CPC .... B65H 2220/03; H04N 19/18; H04N 19/40; B29B 13/023; B29C 51/18; A61K 38/00;
(Continued)

(56) References Cited

U.S. PATENT DOCUMENTS

| 4,902,061 A | 2/1990 | Plavetich et al. |
| 6,050,628 A | 4/2000 | Allison et al. |

(Continued)

FOREIGN PATENT DOCUMENTS

| DE | 19906052 B4 | 4/2011 |
| DE | 102011118576 B4 | 6/2015 |

(Continued)

OTHER PUBLICATIONS

International Search Report and the Written Opinion of the International Searching Authority for International Patent Publication No. PCT/US2018/012056 dated May 10, 2018 (in English) (31 pages).

*Primary Examiner* — Kiran B Patel

(57) ABSTRACT

A component for a vehicle interior is disclosed. The component may comprise a base, a bin moveable between closed and open positions, a tray moveable between retracted and intermediate positions and a cover moveable between an upward position to cover the tray and a lowered position to uncover the tray. The bin may be opened when the tray is in the retracted and intermediate positions. The tray may move from the retracted to the intermediate position when the bin is open and closed. The tray may move from the intermediate to an extended position. The component may comprise a mechanism to retain the bin, guide movement of the bin and guide movement of the cover. The component may comprise a first button to move the cover to uncover the tray and a second button to move the cover and open the bin.

20 Claims, 8 Drawing Sheets

Related U.S. Application Data

(60) Provisional application No. 62/442,257, filed on Jan. 4, 2017.

(51) Int. Cl.
    *B60K 37/04*     (2006.01)
    *B60N 3/10*     (2006.01)

(58) Field of Classification Search
    CPC .... A61K 31/41; A61K 2300/00; A61K 31/52; A61K 31/57
    See application file for complete search history.

(56) References Cited

U.S. PATENT DOCUMENTS

| | | |
|---|---|---|
| 6,851,736 B1 | 2/2005 | Klopp, III et al. |
| 8,602,476 B2 | 12/2013 | Doll |
| 8,919,852 B2 | 12/2014 | Schulz |
| 9,862,327 B2 | 1/2018 | Huebner et al. |
| 10,343,574 B2 * | 7/2019 | Faruque ............ F16C 35/02 |
| 10,363,560 B1 * | 7/2019 | Charette ............ E05B 39/005 |
| 2002/0089203 A1 * | 7/2002 | Flowerday ............ B60N 3/08 296/37.8 |
| 2006/0071497 A1 * | 4/2006 | Radu ............ B60N 3/102 296/24.34 |
| 2008/0079279 A1 * | 4/2008 | Spykerman ............ B60N 2/793 296/24.34 |
| 2009/0096240 A1 * | 4/2009 | Hanzel ............ B60N 3/08 296/37.8 |
| 2009/0174207 A1 * | 7/2009 | Lota ............ B60R 7/04 296/24.34 |
| 2010/0090491 A1 * | 4/2010 | Hipshier ............ B60R 7/04 296/24.34 |
| 2011/0169292 A1 * | 7/2011 | Gayon ............ B60R 7/06 296/37.12 |
| 2012/0112489 A1 * | 5/2012 | Okimoto ............ E05B 77/04 296/37.12 |
| 2012/0200385 A1 * | 8/2012 | Savage ............ B25H 3/00 340/5.7 |
| 2014/0110962 A1 * | 4/2014 | Bohnenberger ....... B60N 3/002 296/37.12 |
| 2015/0291104 A1 * | 10/2015 | Kearney ............ B60R 7/04 296/37.12 |
| 2016/0193967 A1 * | 7/2016 | Hipshier ............ B60N 3/10 296/37.8 |
| 2016/0344221 A1 * | 11/2016 | Kramer ............ H02J 7/025 |
| 2017/0341544 A1 * | 11/2017 | Bozio ............ B60R 7/04 |
| 2018/0162283 A1 * | 6/2018 | Ranganathan ......... B60N 2/793 |
| 2018/0297706 A1 * | 10/2018 | Beets ............ F25D 3/125 |

FOREIGN PATENT DOCUMENTS

| | | |
|---|---|---|
| EP | 1193129 A1 | 4/2002 |
| GB | 2325441 B | 4/2001 |
| JP | 2001180358 A | 7/2001 |
| JP | 200844579 A | 2/2008 |
| JP | 4271885 B2 | 6/2009 |
| KR | 100973134 B1 | 9/2009 |
| KR | 2018/012056 A | 5/2018 |

\* cited by examiner

VEHICLE INTERIOR COMPONET

CROSS-REFERENCE TO RELATED APPLICATIONS

The present application is a continuation of International/PCT Patent Application No. PCT/US2018/012056 titled "VEHICLE INTERIOR COMPONENT" filed Jan. 2, 2018, which claims the benefit of U.S. Provisional Patent Application No. 62/442,257 titled "VEHICLE INTERIOR COMPONENT" filed Jan. 4, 2017.

The present application claims priority to and incorporates by reference in full the following patent application(s): (a) U.S. Provisional Patent Application No. 62/442,257 titled "VEHICLE INTERIOR COMPONENT" filed Jan. 4, 2017; (b) International/PCT Patent Application No. PCT/US2018/012056 titled "VEHICLE INTERIOR COMPONENT" filed Jan. 2, 2018.

FIELD

The present invention relates to a vehicle interior component. The present invention also relates to an instrument panel assembly for a vehicle interior. The present invention further relates to a vehicle component providing an assembly comprising a receptacle such as a bin and a tray/drawer.

BACKGROUND

It is well-known to provide an instrument panel for a vehicle interior. It is further known to provide an instrument panel that provides a component.

It would be advantageous to provide an improved instrument panel assembly providing an assembly comprising a receptacle such as a bin and a tray/drawer.

SUMMARY

The present invention relates to a component for a vehicle interior configured to stow an article. The component may comprise a base; a bin coupled to the base comprising a receptacle into which the article can be stowed and configured to move relative to the base in an opening direction from a closed position to an open position for access; a tray coupled to the base and configured to move relative to the base from a retracted position to an intermediate position for access; and a cover coupled to the base configured to move from an upward position to cover the tray to a lowered position to uncover the tray. The bin may be configured to move relative to the base from the closed position to the open position when the tray is in the retracted position and the intermediate position. The tray may be configured to move from the retracted position to the intermediate position when the bin is in the closed position and the open position. The tray may be configured to move relative to the base from the intermediate position to an extended position. The component may comprise a spring; the spring may be configured to move the tray from the extended position to the intermediate position. The tray may be configured to move from the intermediate position to the extended position when the bin is in the closed position and the open position. The component may comprise a mechanism configured to latch the tray to the base in the retracted position and unlatch the tray from the base. The component may comprise a mechanism configured to retain the bin in the closed position, guide movement of the bin from the closed position to the open position and guide movement of the cover from the upward position to the lowered position. The component may comprise a mechanism configured to retain the tray in the retracted position and move the tray from the retracted position to the intermediate position.

The present invention also relates to a component for a vehicle interior configured to stow an article. The component may comprise a base; a bin coupled to the base comprising a receptacle into which the article can be stowed and configured to move relative to the base in an opening direction from a closed position to an open position for access; a tray coupled to the base and configured to move relative to the base from a retracted position to an intermediate position for access; a cover coupled to the base configured to move from an upward position to cover the tray to a lowered position to uncover the tray; and a mechanism. The mechanism may be configured to retain the bin in the closed position, guide movement of the bin from the closed position to the open position and guide movement of the cover from the upward position to the lowered position. The cover may be coupled to the bin. The mechanism may be configured to guide movement of the cover and the bin. The mechanism may comprise a latch configured to retain the bin in the closed position and a gear and a rack configured to guide movement of the cover and the bin. The mechanism may be configured to retain the tray in the retracted position and move the tray from the retracted position to the intermediate position. The mechanism may comprise a latch configured to retain the tray in the retracted position and a spring configured to move the tray from the retracted position to the intermediate position. The mechanism may be configured to guide movement of the cover from the upward position to the lowered position and then move the tray from the retracted position to the intermediate position. The mechanism may comprise a latch configured to retain the cover in the upward position and a gear and a rack configured to guide movement of the cover from the upward position to the lowered position.

The present invention also relates to a component for a vehicle interior configured to stow an article. The component may comprise a base; a bin coupled to the base comprising a receptacle into which the article can be stowed and configured to move relative to the base in an opening direction from a closed position to an open position for access; a tray coupled to the base and configured to move relative to the base from a retracted position to an intermediate position for access; a cover coupled to the base configured to move from an upward position to cover the tray to a lowered position to uncover the tray; a first button and a second button. The first button may be configured to move the cover relative to the bin from the upward position to the lowered position to uncover the tray and move the tray relative to the base from the retracted position to the intermediate position for access. The first button may be configured to move the tray relative to the base from the retracted position to the intermediate position for access when the first button is pressed after the second button. The second button may be configured to move the bin relative to the base from the closed position to the open position for access. The second button may be configured to move the cover from the upward position to the lowered position and move the bin relative to the base from the closed position to the open position for access.

The present invention relates to a component for a vehicle interior. The component may be configured to stow an article. The component may comprise a base, a bin, a tray and a cover. The bin may be coupled to the base. The bin may comprise a receptacle into which the article can be stowed. The bin may be configured to move relative to the base in an opening direction from a closed position to an open position for access. The tray may be coupled to the base. The tray may be configured to move relative to the base from a retracted position to an intermediate position for access. The cover may be coupled to the base. The cover may be configured to move from an upward position to cover the tray to a lowered position to uncover the tray.

The component may comprise a mechanism configured to (a) retain the bin in the closed position (b) guide movement of the bin from the closed position to the open position and (c) guide movement of the cover from the upward position to the lowered position. The cover may be coupled to the bin. The mechanism may be configured to guide movement of the cover and the bin. The mechanism may comprise (a) a latch configured to retain the bin in the closed position and (b) a gear and a rack configured to guide movement of the cover and the bin.

The component may comprise a mechanism configured to (a) retain the tray in the retracted position and (b) move the tray from the retracted position to the intermediate position. The mechanism may comprise a latch configured to retain the tray in the retracted position and a spring configured to move the tray from the retracted position to the intermediate position. The mechanism may be configured to (a) retain the cover in the upward position and (b) guide movement of the cover from the upward position to the lowered position. The mechanism may comprise a latch configured to retain the cover in the upward position and a gear and a rack configured to guide movement of the cover from the upward position to the lowered position. The mechanism may be configured to guide movement of the cover from the upward position to the lowered position and then move the tray from the retracted position to the intermediate position. The component may comprise a button, and the mechanism may be configured to move the cover and the tray in response to actuation of the button.

The tray may be configured to move relative to the base from the intermediate position to an extended position. The component may comprise a spring. The spring may be configured to move the tray from the extended position to the intermediate position. The tray may be configured to move from the intermediate position to the extended position when the bin is in the closed position and the open position.

The tray may be latched to the base in the retracted position. The component may comprise a mechanism configured to (a) latch the tray to the base in the retracted position and (b) unlatch the tray from the base. The mechanism may comprise at least one of (a) a latch (b) a mechatronic latch. The mechanism may be configured to move the tray from the retracted position to the intermediate position. The mechanism may comprise a spring configured to move the tray from the retracted position to the intermediate position.

The cover may be latched to the base in the upward position. The component may comprise a mechanism configured to (a) latch the cover to the base in the upward position and (b) unlatch the cover from the base.

The component may comprise a first button and a second button. The first button may be configured to (a) move the cover relative to the bin from the upward position to the lowered position to uncover the tray and (b) move the tray relative to the base from the retracted position to the intermediate position for access. The first button may be configured to move the tray relative to the base from the retracted position to the intermediate position for access when the first button is pressed after the second button. The second button may be configured to move the bin relative to the base from the closed position to the open position for access. The second button may be configured to (a) move the cover relative to the bin from the upward position to the lowered position and (b) move the bin relative to the base from the closed position to the open position for access when the second button is pressed before the first button.

The cover may be configured to move relative to the base in the downward direction from the upward position to the lowered position to uncover the tray. The bin may be configured to move relative to the base from the closed position to the open position when the tray is in the retracted position and the intermediate position. The tray may be configured to move from the retracted position to the intermediate position when the bin is in the closed position and the open position. The cover may be configured to prevent movement of the tray when the cover is in the upward position. The cover may be configured to allow movement of the tray when the cover is in the lowered position.

The present invention further relates to a component for a vehicle interior. The component may be configured to stow an article. The component may comprise a base, a bin, a tray, a first actuator and a second actuator. The bin may be coupled to the base. The bin may comprise a receptacle into which the article can be stowed. The bin may be configured to move relative to the base in an opening direction from a closed position to an open position for access. The tray may be coupled to the base. The tray may be configured to move relative to the base from a retracted position to an intermediate position for access. The first actuator may be configured to move the tray relative to the base from the retracted position to the intermediate position for access. The second actuator may be configured to move the bin relative to the base from the closed position to the open position for access. The bin may be configured to move relative to the base from the closed position to the open position when the tray is in the retracted position and the intermediate position. The tray may be configured to move from the retracted position to the intermediate position when the bin is in the closed position and the open position. The first actuator may comprise a first button and the second actuator may comprise a second button.

FIGURES

DESCRIPTION

Figure 1A:
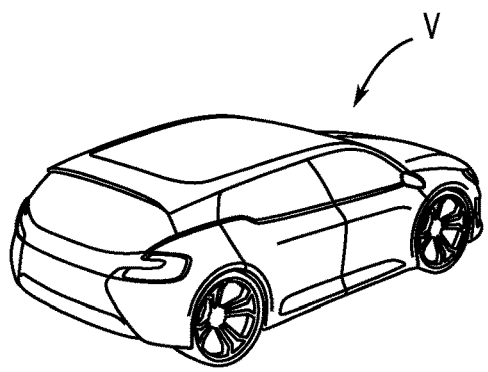
FIG. 1A is a schematic perspective view of a vehicle according to an exemplary embodiment.
Figure 1B:
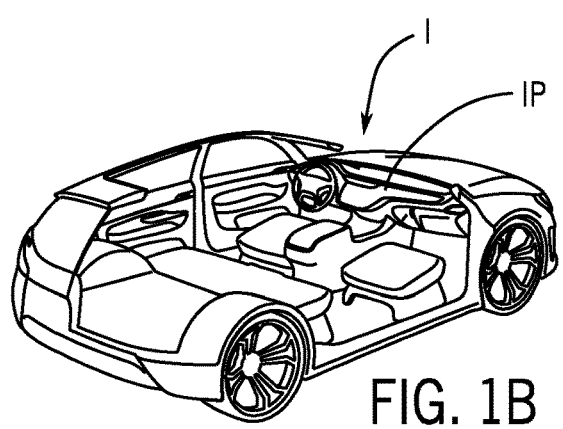
FIG. 1B is a schematic perspective cut-away view of a vehicle showing an interior according to an exemplary embodiment.

According to an exemplary embodiment as shown schematically in FIGS. 1A to 1B, a vehicle V may include an interior I and a component shown as an instrument panel IP.

Figure 2A:
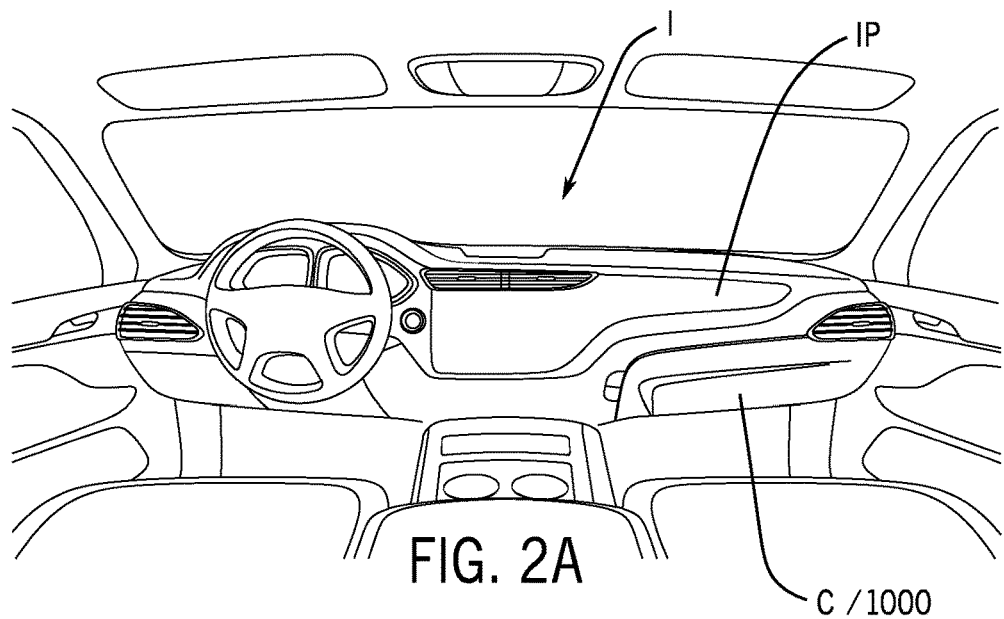
FIGS. 2A to 2B are schematic perspective views of the interior of the vehicle according to an exemplary embodiment.
Figure 2B:
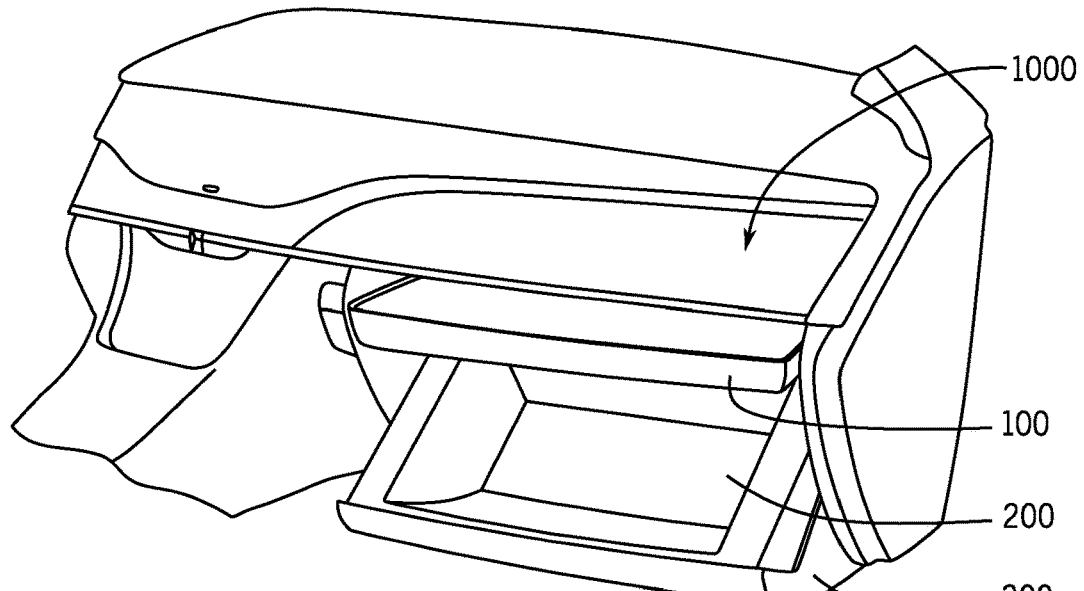

According to an exemplary embodiment as shown schematically in FIGS. 2A to 2B, interior I may include an instrument panel IP. Instrument panel IP may comprise a component C/1000 shown as a glove box. As shown schematically in FIG. 2B, component 1000 may at least comprise a tray or drawer 100, a bin 200 and a cover 300. Tray 100 may be uncovered or revealed by an open bin 200 or by cover 300 sliding downward.

Figure 3:
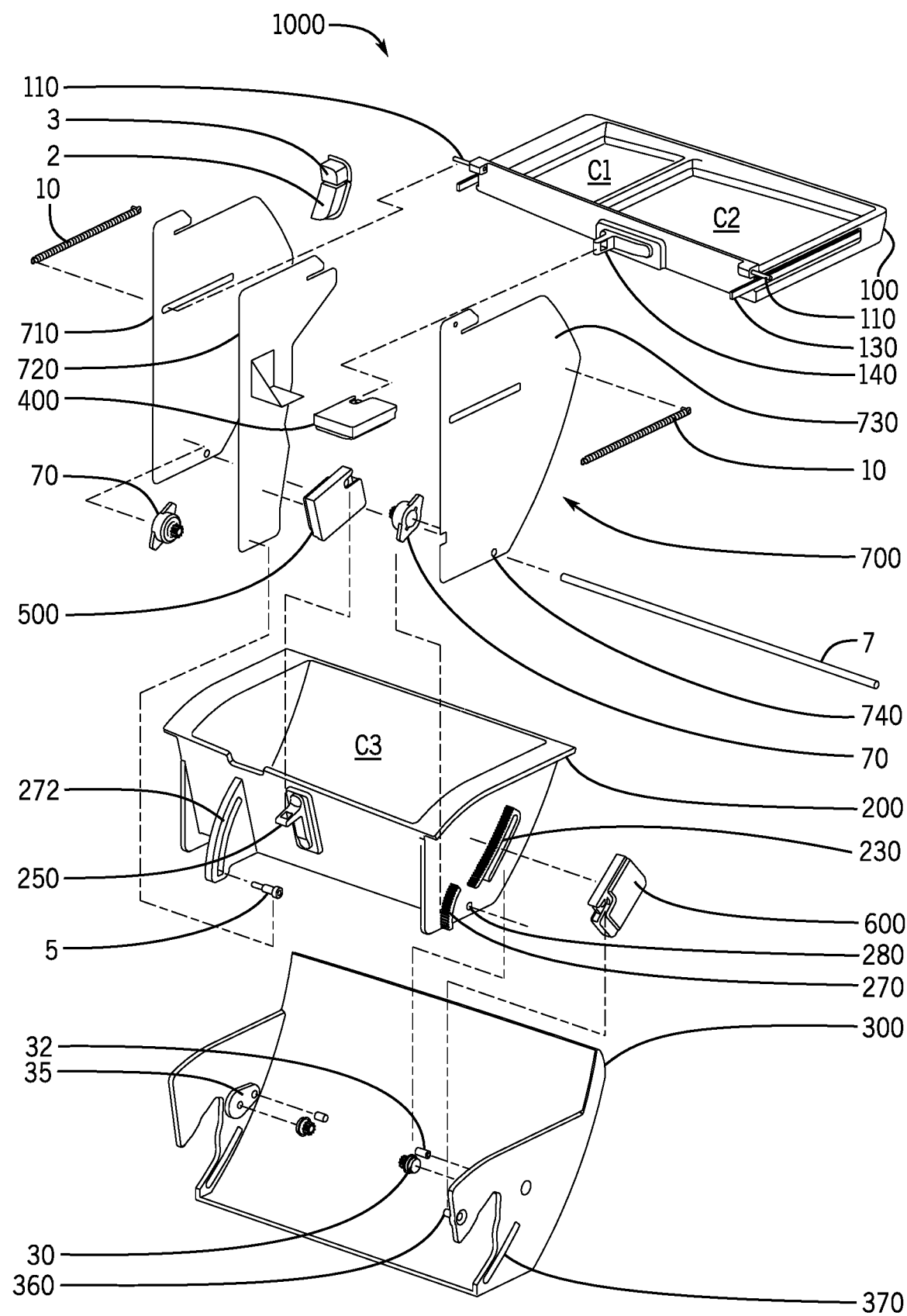
FIG. 3 is a schematic exploded perspective view of a component shown as an instrument panel assembly according to an exemplary embodiment.

According to an exemplary embodiment as shown schematically in FIG. 3, a vehicle interior component shown as an instrument panel assembly 1000 may comprise tray or drawer 100, bin 200, cover 300 and a base 700. The tray 100, bin 200 and cover 300 may be coupled to base 700 and may be configured to move relative to base 700. Bin 200 may move in an opening direction from a closed position to an open position for access. Bin 200 may rotate relative to base 700. Tray 100 may move in an outward direction from a retracted position to an intermediate, or partially open, position for access. Tray 100 may move or slide outward relative to base 700 from the retracted position to the intermediate position or from the intermediate position to an extended position. Outward movement of the tray 100 may be generally linear.

According to an exemplary embodiment, bin 200 may comprise a receptacle into which an article can be stowed. Access to the stowed article may be provided when bin 200 is in the open position. Tray 100 may comprise a receptacle into which an article can be stowed. Access to the stowed article may be provided when tray 100 is in the intermediate position or the extended position.

According to an exemplary embodiment, cover 300 may move with bin 200 from the closed position to the open position. Cover 300 may be configured to move relative to bin 200 and base 700 in a downward direction from an upward position to a lowered position to uncover tray 100. Cover 300 may be configured to allow movement of tray 100 from the retracted position to the intermediate position when cover 300 is in the lowered position. Cover 300 may be configured to conceal tray 100. Cover 300 may prevent outward movement of tray 100. Cover 300 may retain tray 100 in the retracted position when the cover 300 is in the upward position.

According to an exemplary embodiment as shown schematically in FIG. 3, vehicle interior component or instrument panel assembly 1000 may comprise an actuator or button 2 and an actuator or button 3. Button 2 and button 3 may be adjacent to cover 300. Button 2 and button 3 may control opening of instrument panel assembly 1000. Button 2 and button 3 may be mechanical or electronic buttons. Button 2 and button 3 may form a mechanical connection between a latch assembly 400, a latch assembly 500 and a latch assembly 600, and the mechanical connections may open latches within latch assembly 400, latch assembly 500 and latch assembly 600. Button 2 and button 3 may form a wired or wireless connection with latch assembly 400, latch assembly 500 and latch assembly 600. Wires may connect button 2 and button 3 to latch assembly 400, latch assembly 500 and latch assembly 600. Actuating or pressing one of button 2 and button 3 may send an electrical signal through the wires to latch assembly 400, latch assembly 500 and/or latch assembly 600 to open the latches within latch assembly 400, latch assembly 500 and latch assembly 600. Actuating or pressing one of button 2 and button 3 may cause a transmitter to transmit a wireless signal to one or more of latch assembly 400, latch assembly 500 and latch assembly 600. The wireless signal may cause one or more of latch assembly 400, latch assembly 500 and latch assembly 600 to release the latch within latch assembly 400, latch assembly 500 and latch assembly 600.

According to an exemplary embodiment as shown schematically in FIG. 3, tray 100 may include one or more pins 110, one or more rails 130, a striker 140, a cavity C1, and a cavity C2. A wall in the receptacle defined by tray 100 may divide tray 100 into multiple cavities C1, C2. Rails 130 may be received by guides (not shown) formed within instrument panel IP. Tray 100 may be configured to move or slide between the retracted position, the intermediate position, and the extended position by rails 130 moving or sliding within the guides.

According to an exemplary embodiment as shown schematically in FIG. 3, base 700 may comprise one or more springs 10, a rod 7, one or more gears 70, one or more holes 740, a sidewall 710, a middle wall 720, and a sidewall 730. Latch assembly 400 and latch assembly 500 may connect to or be on a middle wall 720 of base 700. Latch assembly 400 may engage striker 140 to lock or latch tray 100 in the retracted position.

According to an exemplary embodiment as shown schematically in FIG. 3, rod 7 may extend between sidewalls 710, 730 of base 700 through holes 740. Rod 7 may extend through gears 70. Rod 7 may extend through holes 280 in bin 200 and guides 370 in cover 300. Cover 300 may slide from the upward position to the lowered position as rod 7 slides within guide 370.

According to an exemplary embodiment, springs 10 engage pins 110 to push pins 110 and tray 100 outward to the intermediate position from the retracted position. Springs 10 may also engage pins 110 to move or pull tray 100 from the extended position to the intermediate position. Springs 10 are neither generally extended nor generally compressed when tray 100 is in the intermediate position (see FIG. 5A). Each spring 10 is attached to a pin 110 at one end of spring 10 and to a sidewall 710, 730 at another end of spring 10. Springs 10 may push tray 100 from the retracted position to the extended position (e.g. the intermediate position may be omitted).

According to an exemplary embodiment as shown schematically in FIG. 3, bin 200 may comprise one or more racks 230, a striker 250, one or more racks 270, a slot 272, and one or more holes 280. Bin 200 may comprise a receptacle and define a cavity C3. Latch assembly 600 may be coupled to bin 200.

According to an exemplary embodiment as shown schematically in FIG. 3, a pin 5 may engage and slide within slot 272. Pin 5 may be connected to middle wall 720 of base 700. Pin 5 may move or slide within slot 272 as bin 200 moves (e.g. rotates, pivots, opens, etc. on hinges) between the open position and the closed position.

According to an exemplary embodiment, racks 270 may comprise ridges for traction. The ridges of racks 270 may define a track. Gears 70 may engage racks 270 and dampen movement or rotation of bin 200 relative base 700. Gears 70 may engage the track of racks 270 and slow the movement of bin 200 from the closed position (see FIG. 4A) to the open position (see FIG. 4E).

According to an exemplary embodiment as shown schematically in FIG. 3, cover 300 may comprise one or more gears 30, one or more pins 32, one or more plates 35, a pin 360, and guide 370.

According to an exemplary embodiment, gears 30 may engage racks 230 as cover 300 moves from the upward position to the lowered position. Racks 230 may comprise ridges for traction. The ridges of racks 230 may define a track. Gears 30 may engage racks 230 and dampen movement of cover 300 relative bin 200. Gears 30 may engage the track of racks 230 and slow the movement of cover 300 from the upward position (see FIG. 4A) to the lowered position (see FIG. 4B). Racks 230 may include a slot beneath the ridges. Pin 32 may engage and slide within the slot of racks 230.

According to an exemplary embodiment as shown schematically in FIG. 3, pins 32 and gears 30 may attach to cover 300 via plate 35.

Figure 4A:
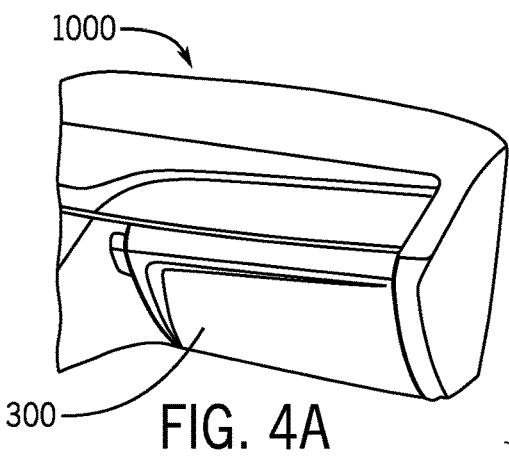
FIGS. 4A to 4G are schematic perspective views of a component shown as an instrument panel assembly according to an exemplary embodiment.

According to an exemplary embodiment, pin 360 may be received by latch assembly 600 to hold cover 300 in the upward position (see FIG. 4A). Latch assembly 600 may release pin 360 to allow cover 300 to move to the lowered position (see FIG. 4B).

According to an exemplary embodiment as shown schematically in FIG. 3, vehicle interior component or instrument panel assembly 1000 may include three latch assemblies 400, 500 and 600. Latch assembly 400 may receive striker 140 connected to tray 100 to hold tray 100 in the closed position. Latch assembly 400 may release striker 140 to allow tray 100 to move to the intermediate position or the extended position. Latch assembly 500 may receive striker 250 connected to bin 200 to hold bin 200 in the closed position. Latch assembly 500 may release striker 250 to allow bin 200 to move to the open position. Latch assembly 600 may receive pin 360 connected to cover 300 to hold cover 300 in the upward position. Latch assembly 600 may release pin 360 to allow cover 300 to move to the lowered position.

According to an exemplary embodiment, at least one of latch assembly 400, latch assembly 500 and latch assembly 600 may be implemented with a mechatronic system (e.g. mechanism operated by electronic control in a module). Actuation or activation of one of actuator or button 2 and actuator or button 3 may cause electronic circuitry within latch assembly 400, latch assembly 500 and/or latch assembly 600 to activate an electric motor in latch assembly 400, latch assembly 500 and/or latch assembly 600 to release a latch and release strikers 140, 250 or pin 360 from the latch assembly 400, latch assembly 500 and/or latch assembly 600. Actuation or activation of button 3 may cause latch assembly 400 to release striker 140 and latch assembly 600 to release pin 360 (if button 3 is actuated or activated before button 2). Actuation or activation of button 2 may cause latch assembly 500 to release striker 250 and latch assembly 600 to release pin 360 (if button 2 is actuated or activated before button 3). Latch assembly 600 may include circuitry and/or logic (e.g. processors, sensors, etc.) to unlatch based on whether button 3 or button 2 was actuated first.

According to an exemplary embodiment as shown schematically in FIG. 3, instrument panel assembly 1000 may comprise various mechanisms. Instrument panel assembly 1000 may comprise a first mechanism that retains bin 200 in the closed position and guides movement of bin 200 from the closed position to the opened position. The first mechanism may comprise latch assembly 500, which may be mechatronic, gear 70 and rack 270, which are configured to guide movement of bin 200 from the closed position to the open position. Latch assembly 500 may be configured to retain bin 200 in the closed position. Bin 200 may be coupled to cover 300. The first mechanism may be configured to guide movement of cover 300 and bin 200. The first mechanism may be configured to latch bin 200 to base 700 in the closed position and unlatch bin 100 from base 700 to allow movement of bin 200 from the closed position to the open position.

According to an exemplary embodiment, instrument panel assembly 100 may comprise a second mechanism configured to retain tray 100 in the retracted position and move tray 100 from the retracted position to the intermediate position. The second mechanism may comprise latch assembly 400, which may be configured to retain tray 100 in the retracted position and spring 10, which may be configured to move tray 100 from the retracted position to the intermediate position. The second mechanism may be configured to latch tray 100 to base 700 and unlatch tray 100 from the base using latch assembly 400. The second mechanism may be configured to retain cover 300 in the upward position and guide movement of cover 300 from the upward position to the lowered position. Cover 300 may be latched to base 700 in the upward position. The second mechanism may be configured to unlatch cover 300 from base 700. The second mechanism may comprise latch assembly 600, gear 30 and rack 230. Latch assembly 600 may be configured to retain or latch cover 300 in the upward position. Gear 30 and rack 230 may be configured to guide movement of cover 300 from the upward position to the lowered position. The second mechanism may be configured to guide movement of cover 300 from the upward position to the lowered position. The second mechanism may be configured to move tray 100 from the retracted position to the intermediate position. The second mechanism may comprise button 3. The second mechanism may move cover 300 and tray 100 in response to actuation of button 3.

According to an exemplary embodiment as shown schematically in FIGS. 4A, 5A, 6A, 7A, 8A and 9A, instrument panel assembly 1000 may be positioned within interior I of vehicle V. As shown schematically in FIG. 4A, cover 300 may cover, conceal or hide bin 200 and tray 100 when cover is in the upward position. Tray 100 may be latched to base 700 when tray 100 is in the retracted position. Latch assembly 400 may latch striker 140 to hold tray 100 in the retracted position. Latch assembly 600 may latch pin 360 to hold cover 300 in the upward position. Latch assembly 500 may latch striker 250 to hold bin 200 in the closed position.

Figure 4B:
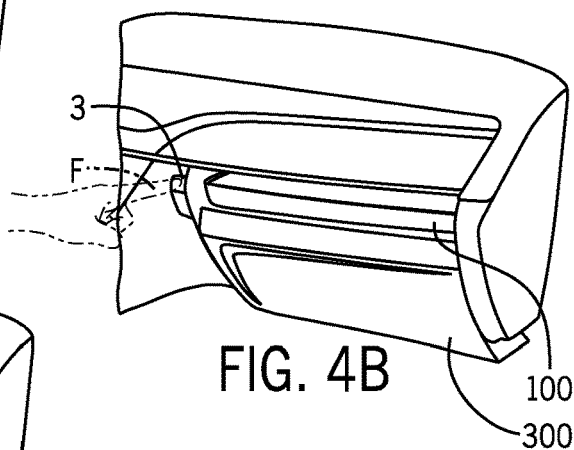
Figure 5A:
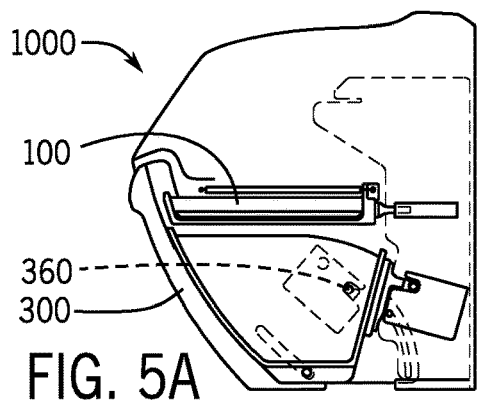
FIGS. 5A to 5G are schematic section views of a component shown as an instrument panel assembly according to an exemplary embodiment.
Figure 5B:
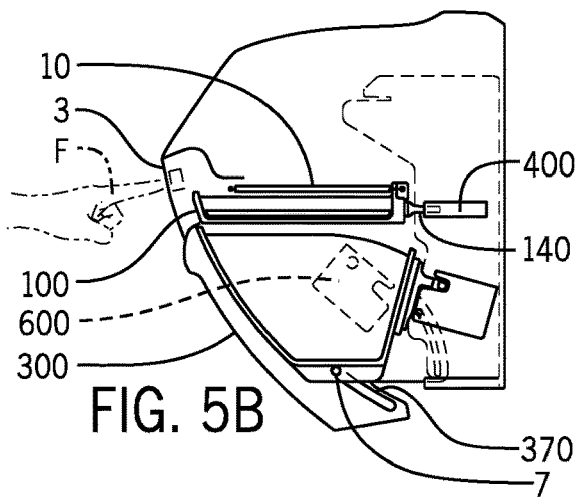
Figure 8A:
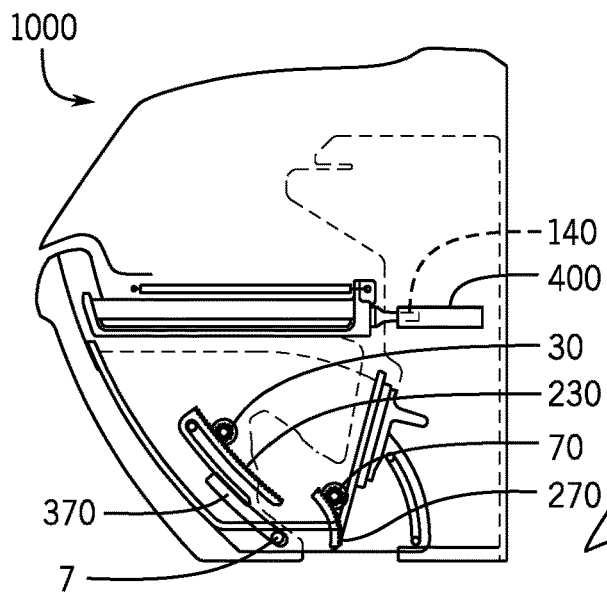
FIGS. 8A to 8D are schematic section views of a component shown as an instrument panel assembly according to an exemplary embodiment.
Figure 8B:
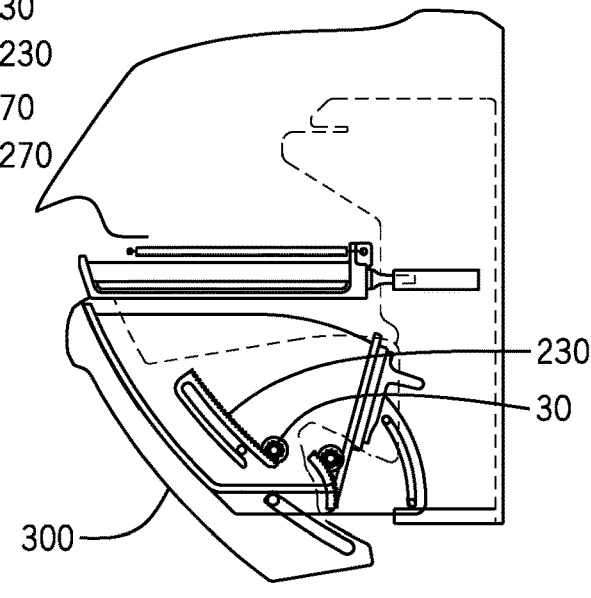

According to an exemplary embodiment as shown schematically in FIGS. 4B, 5B, and 8B, a finger F may actuate or press button 3. Actuation or pressing of button 3 may cause cover 300 to move to the lowered position and uncover or reveal tray 100. Movement of cover 300 to the lowered position may allow tray 100 to move or slide to the intermediate or extended positions. As shown schematically in FIGS. 5B and 8B, latch assembly 600 may release pin 360, guide 370 may move or slide about rod 7, and gears 30 may engage racks 230 as cover 300 moves to the lowered position. Gears 30 may engage racks 230 to dampen movement of cover 300. Guide 370 may guide movement of cover 300 as guide 370 slides about rod 7.

According to an exemplary embodiment as shown schematically in FIGS. 5A, 5B, 7A, 7B, 8A, 8B, 9A and 9B, spring 10 may be extended. Spring 10 may provide a force to tray 100 when extended. Latch assembly 400 may overcome the force provided by spring 10 to tray 100 to maintain or hold tray 100 in the retracted position.

Figure 4C:
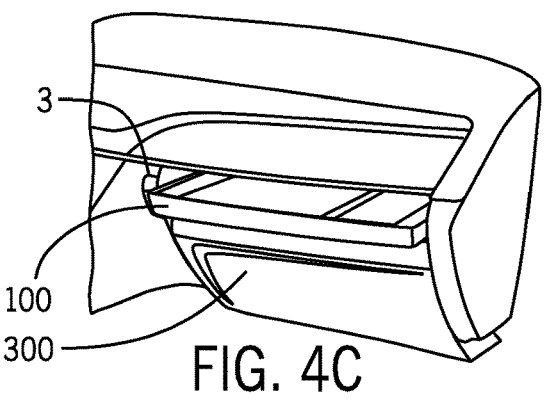
Figure 8C:
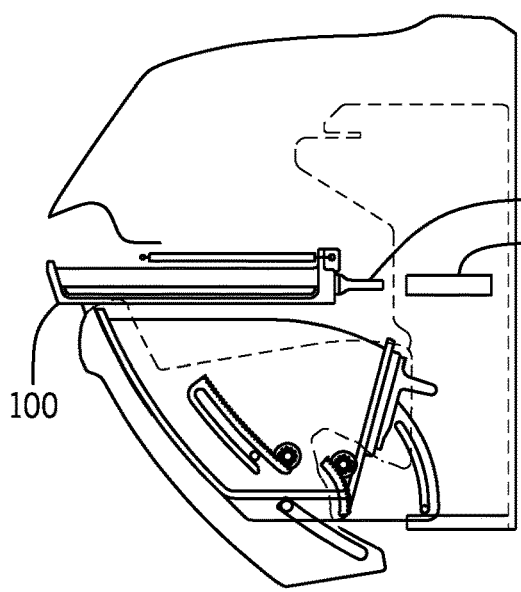

According to an exemplary embodiment as shown schematically in FIG. 4C, tray 100 may move or slide in response to actuation of button 3. Tray 100 may move or slide to the intermediate position or a partially open position. As shown schematically in FIGS. 4B and 4C, button 3 is configured to move cover 300 relative to bin 200 from the upward position to the lowered position to uncover tray 100 and move tray 100 relative to the base 700 from the retracted position to the intermediate position for access. As shown schematically in FIGS. 5C and 8C, latch assembly 400 may release striker 140, and spring 10 may move tray 100 to the intermediate position. When tray 100 is in the intermediate position, spring 10 may be neither compressed nor extended. Spring 10 may be configured to bias tray 100 in the intermediate position.

Figure 4D:
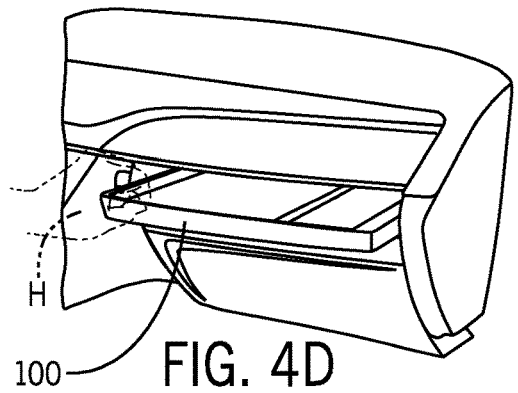
Figure 5C:
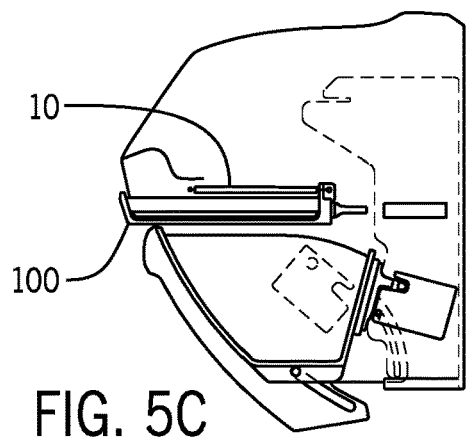
Figure 5D:
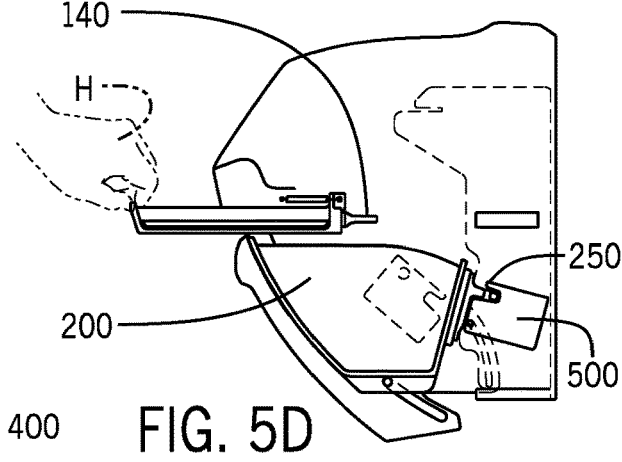

According to an exemplary embodiment as shown schematically in FIGS. 4D and 5D, a hand H may provide a force to move or pull tray 100 to the extended or fully opened position. In the extended position, spring 10 may be compressed against side wall 710, 730 and may apply a force to tray 100. Spring 10 may be configured to move tray 100 from the extended position to the intermediate position when the force from hand H is released.

Figure 4E:
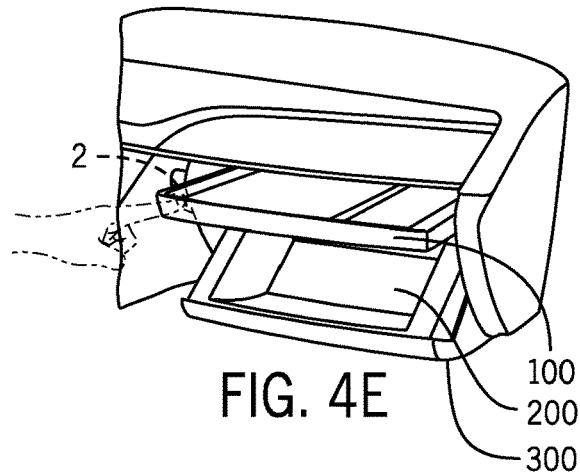
Figure 8D:
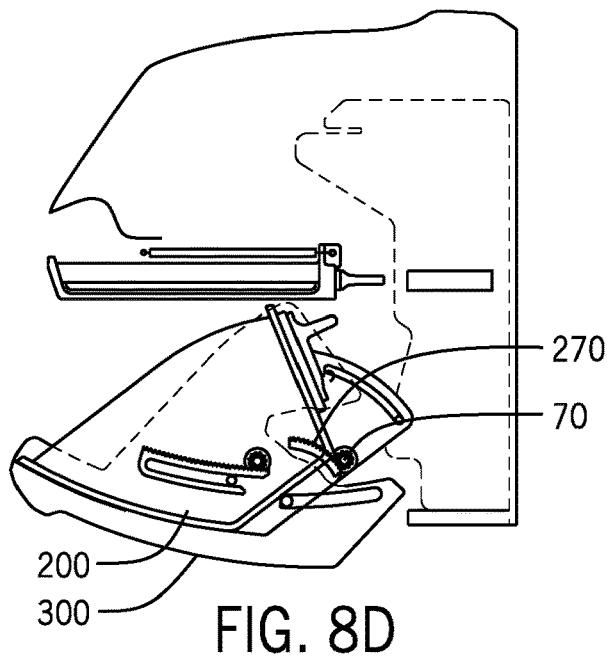

According to an exemplary embodiment as shown schematically in FIG. 4E, finger F may engage button 2 to move or rotate bin 200 from the closed position to the open position. As shown schematically in FIG. 4E, button 2 may be configured to move bin 200 relative to base 700 from the closed position to the open position for access. As shown schematically in FIGS. 5E and 8D, in response to actuation or pressing of button 2, latch assembly 500 may release striker 250, gears 70 may engage rack 270 and bin 200 may move to the open position. Bin 200 may move or slide to the open position in response to actuation or pressing of button 2. In response to release of force on tray 100, spring 10 may compress and move or push the tray 100 to the intermediate position. Spring 10 may be configured to move tray 100 from the extended position to the intermediate position.

Figure 4F:
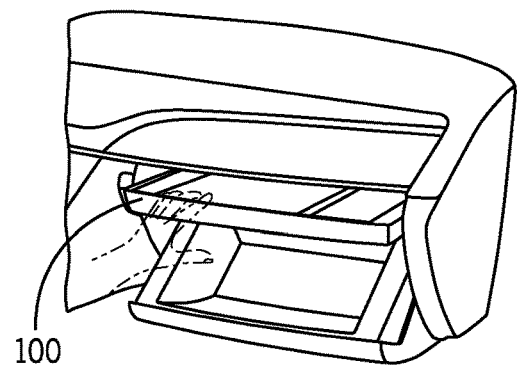
Figure 5E:
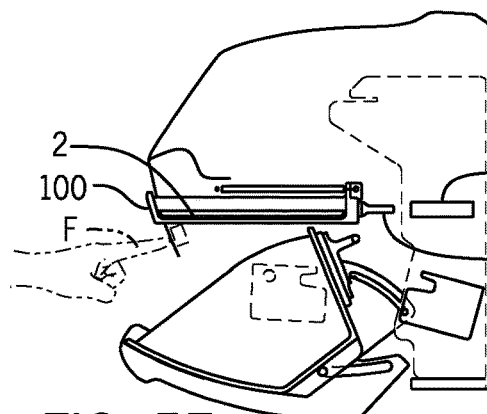
Figure 5F:
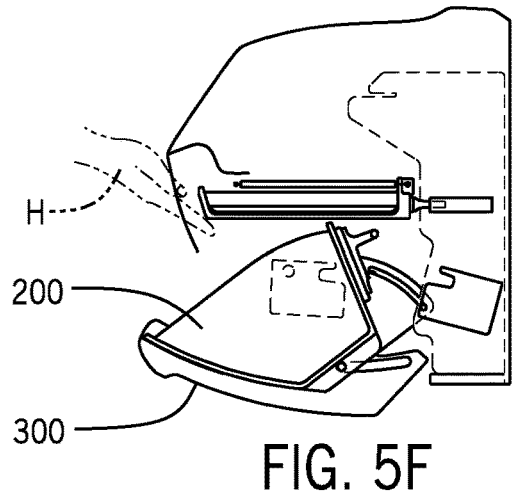

According to an exemplary embodiment as shown schematically in FIGS. 4F and 5F, hand H may move or push tray 100 from the intermediate position to the retracted position. Tray 100 may be engaged with latch assembly 400 to hold tray 100 in the retracted position. Tray 100 may configured to move (a) from the retracted position to the intermediate position, (b) from the intermediate position to the retracted position, (c) from the intermediate position to the extended position, (d) from the extended position to the intermediate position, (e) from the retracted position to the extended position, and/or (f) from the extended position to the retracted position when bin 200 is in the closed position and the open position.

Figure 4G:
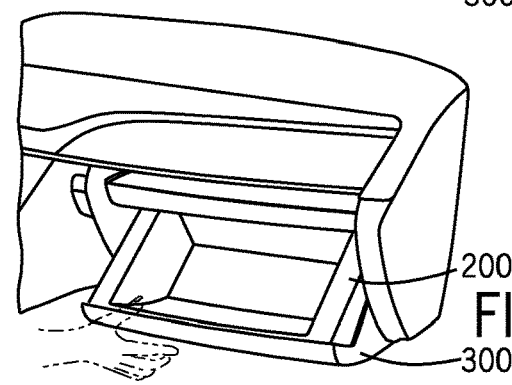
Figure 5G:
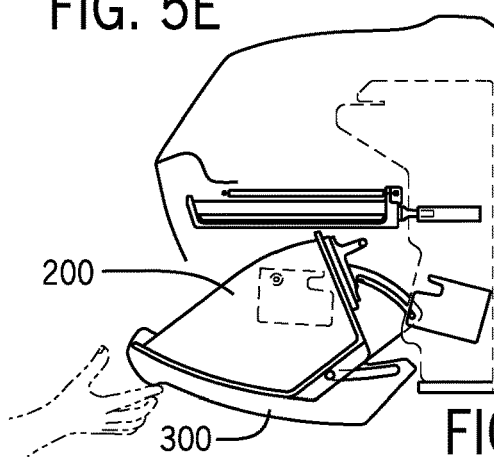

According to an exemplary embodiment as shown schematically in FIGS. 4G and 5G, hand H may provide a force to move or push bin 200 and/or cover 300 to move bin 200 from the open position to the closed position and to move cover 300 from the lowered position to the upward position.

According to an exemplary embodiment as shown schematically in FIGS. 5A through 5C and 8A through 8C, vehicle interior component or instrument panel assembly 1000 may comprise a mechanism configured to retain tray 100 in the retracted position and move tray 100 from the retracted position to the intermediate position. The mechanism may comprise latch assembly 400 and spring 10. Latch assembly 400 may be configured to retain tray 100 in the retracted position as shown schematically in FIG. 5A. Spring 10 may be configured to move tray 100 from the retracted position to the intermediate position as shown schematically in FIG. 5C. The mechanism may be configured to retain cover 300 in the upward position as shown schematically in FIG. 5A and guide movement of cover 300 from the upward position to the lowered position as shown schematically in FIG. 5B. The mechanism may comprise latch 600. Latch 600 may be configured to retain cover 300 in the upward position as shown schematically in FIG. 5A. The mechanism may comprise gear 30 and rack 230. Gear 30 and rack 230 may be configured to guide movement of cover 300 from the upward position to the lowered position as shown schematically in FIGS. 8A and 8B. The mechanism may be configured to guide movement of cover 300 from the upward position to the lowered position and then move tray 100 from the retracted position to the intermediate position as shown schematically in FIGS. 5A to 5C and 8A to 8C. As shown schematically in FIGS. 4B, 4C, 5B and 5C, vehicle interior component or instrument panel assembly 1000 may comprise actuator or button 3. The mechanism may be configured to move cover 300 and tray 100 in response to actuation of button 3.

According to an exemplary embodiment, tray 100 may be configured to move relative to base 700 from an intermediate position as shown schematically in FIGS. 4C and 5C to an extended position as shown schematically in FIGS. 4D and 5D. Spring 10 may be configured to move tray 100 from the extended position to the intermediate position as shown schematically in FIGS. 5D and 5E. Tray 100 may be configured to move from the intermediate position to the extended position when bin 200 is in the closed position as shown schematically in FIG. 5D and when bin 200 is in the open position as shown schematically in FIG. 7D.

Figure 7A:
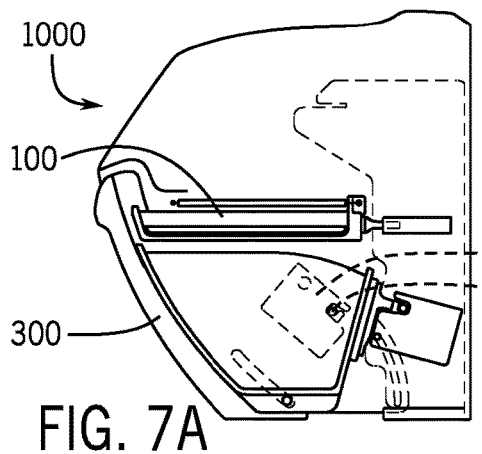
FIGS. 7A to 7F are schematic section views of a component shown as an instrument panel assembly according to an exemplary embodiment.
Figure 7B:
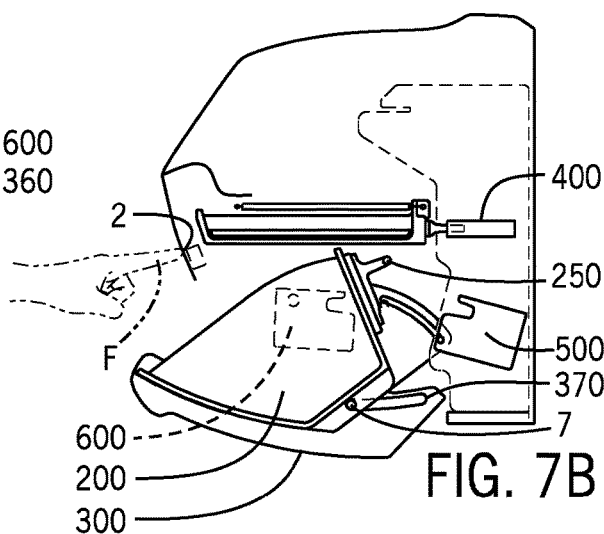

According to an exemplary embodiment, tray 100 may be latched to base 700 in the retracted position as shown schematically in FIGS. 7A and 7B. Vehicle interior component or instrument panel assembly 1000 may comprise a mechanism configured to latch tray 100 to base 700 in the retracted position as shown schematically in FIGS. 7A and 7B and unlatch tray 100 from base 700 as shown schematically in FIG. 7C. The mechanism may comprise at least one of a latch and a mechatronic latch. The mechanism may be configured to move tray 100 from the retracted position to the intermediate position as shown schematically in FIG. 7C. The mechanism may comprise spring 10. Spring 10 may be configured to move tray 100 from the retracted position to the intermediate position as shown schematically in FIGS. 7B and 7C.

According to an exemplary embodiment, cover 300 may be latched to base 700 in the upward position as shown schematically in FIG. 5A. Vehicle interior component or instrument panel assembly 1000 may comprise a mechanism configured to latch cover 300 to base 700 as shown schematically in FIG. 5A and unlatch cover 300 from base 700 as shown schematically in FIGS. 5B through 5F.

According to an exemplary embodiment, vehicle interior component or instrument panel assembly 1000 may comprise first actuator or button 3 and second actuator or button 2. First button 3 may be configured to move cover 300 relative to bin 200 from an upward position to a lowered position to uncover tray 100 as shown schematically in FIGS. 4B and 5B and move tray 100 relative to base 700 from the retracted position to the intermediate position for access as shown schematically in FIGS. 4C and 5C. First button 3 may be configured to move tray 100 relative to base 700 from the retracted position to the intermediate position for access when first button 3 is pressed after second button 2 as shown schematically in FIGS. 6B, 6C, 7B and 7C. Second button 2 may be configured to move bin 200 relative to base 700 from the closed position to the open position for access as shown schematically in FIGS. 6B and 7B. Second button 2 may be configured to move cover 300 from the upward position to the lowered position and move bin 200 relative to base 700 from the closed position to the open position for access when second button 2 is pressed before first button 3 as shown schematically in FIGS. 6B, 6C, 7B and 7C.

According to an exemplary embodiment, cover 300 may be configured to move relative to base 700 in a downward direction from the upward position to the lowered position to uncover tray 100 as shown schematically in FIGS. 4B and 5B.

Figure 6A:
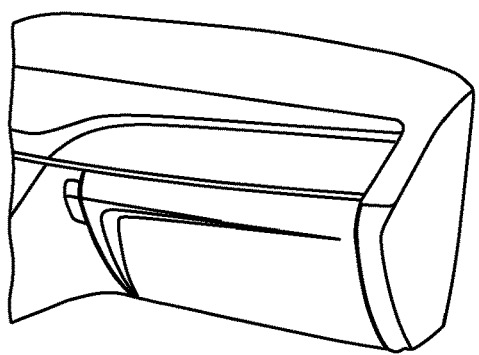
FIGS. 6A to 6F are schematic perspective views of a component shown as an instrument panel assembly according to an exemplary embodiment.
Figure 6B:
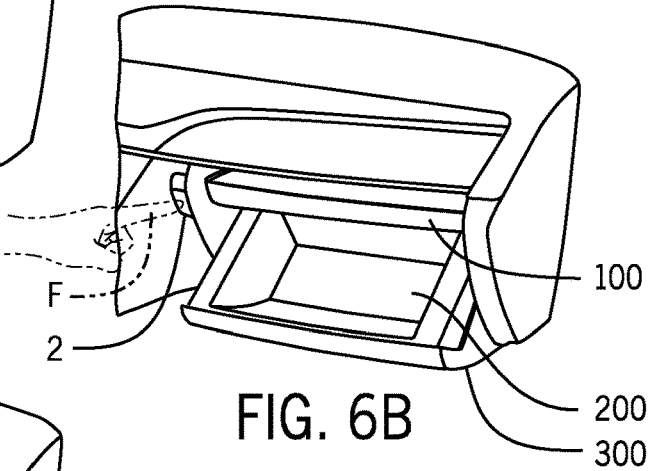

According to an exemplary embodiment, bin 200 may be configured to move relative to base 700 from the closed position to the open position when tray 100 is in the retracted position as shown schematically in FIGS. 6B and 7B and when tray 100 is in the intermediate position as shown schematically in FIGS. 4E and 5E.

Figure 6C:
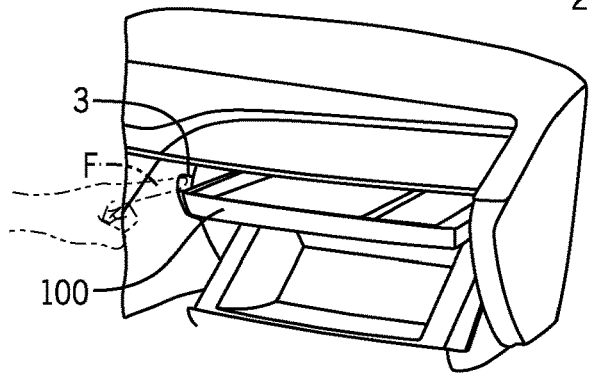
Figure 7C:
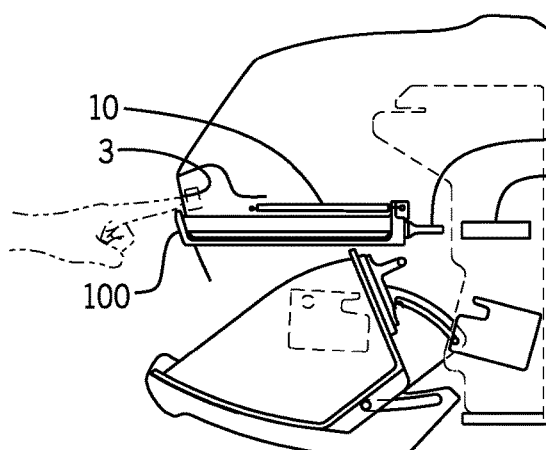

According to an exemplary embodiment, tray 100 may configured to move from the retracted position to the intermediate position when bin 200 is in the closed position as shown schematically in FIGS. 4C and 5C and when bin 200 is in the open position as shown schematically in FIGS. 6C and 7C.

According to an exemplary embodiment, cover 300 may be configured to prevent movement of tray 100 when cover 300 is in the upward position as shown schematically in FIGS. 4A and 5A. Cover 300 may be configured to allow movement of tray 100 when cover 300 is in the lowered position as shown schematically in FIGS. 4B and 5B.

Figure 9A:
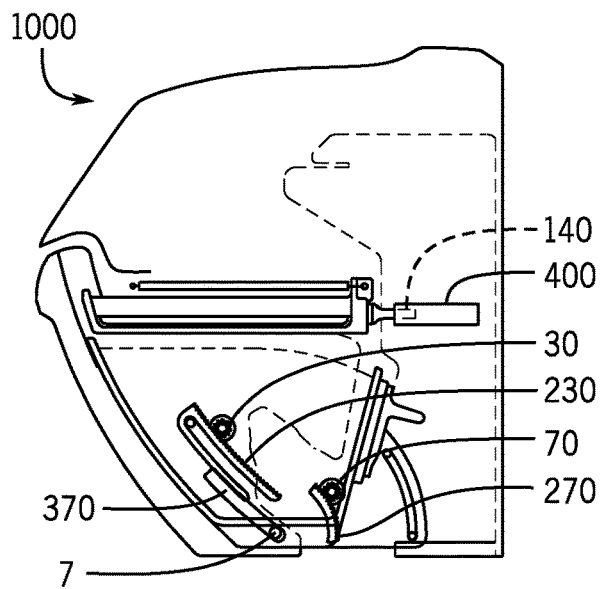
FIGS. 9A to 9C are schematic section views of a component shown as an instrument panel assembly according to an exemplary embodiment.
Figure 9B:
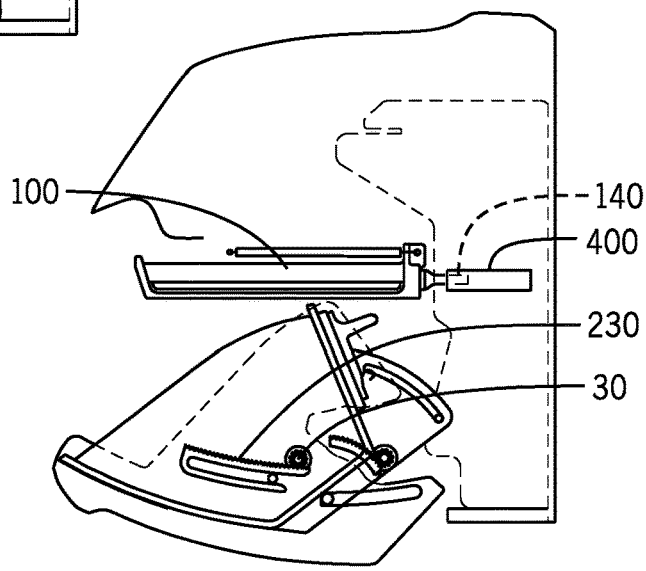

According to an exemplary embodiment as shown schematically in FIGS. 6B, 7B and 9B, actuation or pressing of button 2 may move cover 300 from the upward position to the lowered position and bin 200 from the closed position to the open position. In response to actuation or pressing of button 2, latch assembly 600 may release pin 360, latch assembly 500 may release striker 250, guide 370 may move or slide about rod 7, gears 30 may engage racks 230, gears 70 may engage rack 270, cover 300 may move to the lowered position, and bin 200 move to the open position. Cover 300 and bin 200 may move or rotate to the open position in response to finger F pressing button 3. Gears 30 may engage racks 230 to dampen movement of cover 300. Gears 70 may engage racks 270 to dampen movement of bin 200 and cover 300 toward the opened position. Guide 370 may guide movement of cover 300 as guide 370 moves or slides about rod 7. Slot 272 may guide movement of bin 200 and cover 300 as slot 272 moves or slides about pin 5.

According to an exemplary embodiment as shown schematically in FIGS. 7B and 5E, bin 200 may configured to move relative to base 700 from the closed position to the open position when tray 100 is in the retracted position and the intermediate position.

According to an exemplary embodiment as shown schematically in FIGS. 7A, 7B, 8C and 8D, vehicle interior component or instrument panel assembly 1000 may comprise a mechanism configured to retain bin 200 in the closed position, guide movement of bin 200 from the closed position to the open position and guide movement of cover 300 from the upward position to the lowered position. The mechanism may be configured to guide movement of cover 300 and bin 200. The mechanism may comprise latch 500, gear 70 and rack 270. Latch 500 may be configured to retain bin 200 in the closed position as shown schematically in FIG. 7A. Gear 70 and rack 270 may be configured to guide movement of cover 300 and bin 200 as shown schematically in FIGS. 8C and 8D.

Figure 9C:
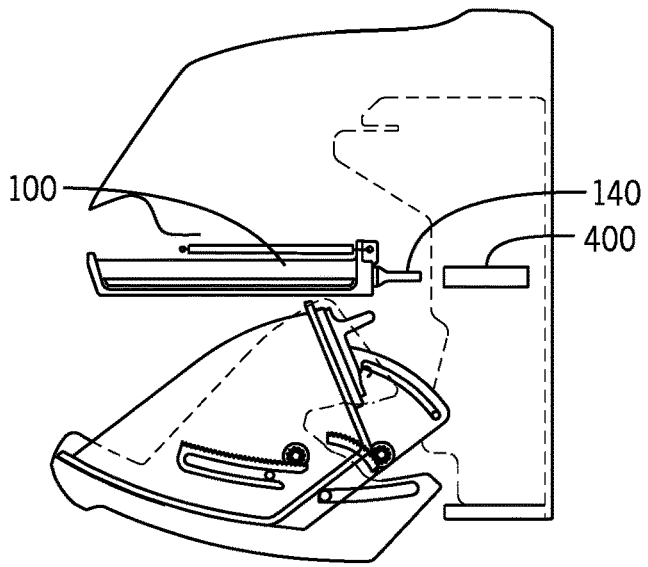

According to an exemplary embodiment as shown schematically in FIGS. 6C, 7C and 9C, in response to actuation or pressing of button 3 with bin 200 in the open position, latch assembly 400 may release striker 140, and tray 100 may move to the intermediate position. Spring 10 may compress and provide a force to move or pull tray 100 from the retraced position to the intermediate position. As shown schematically in FIGS. 7C and 5C, tray 100 may be configured to move from the retracted position to the intermediate position when bin 200 is in the closed position and the open position.

Figure 6D:
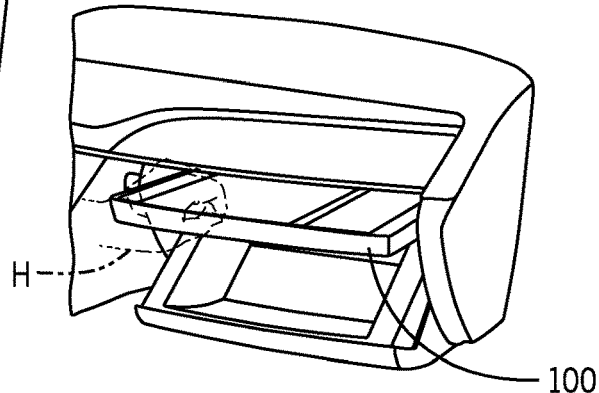
Figure 7D:
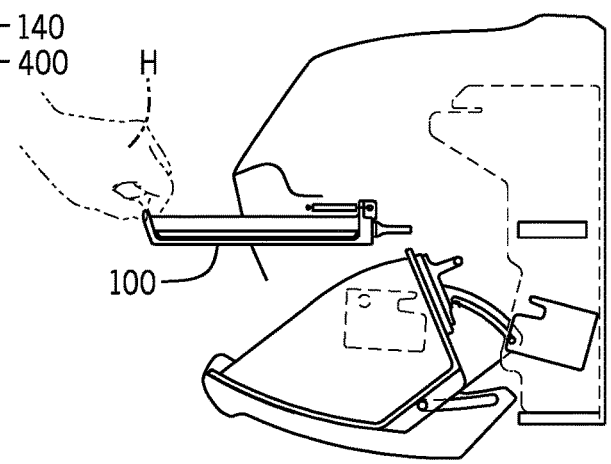

According to an exemplary embodiment as shown schematically in FIGS. 6D and 7D, hand H may provide a force to move or pull tray 100 from the intermediate position to the extended position when bin 200 is in the open position. Spring 10 is configured to compress as tray 100 moves from the intermediate position to the extended position.

Figure 6E:
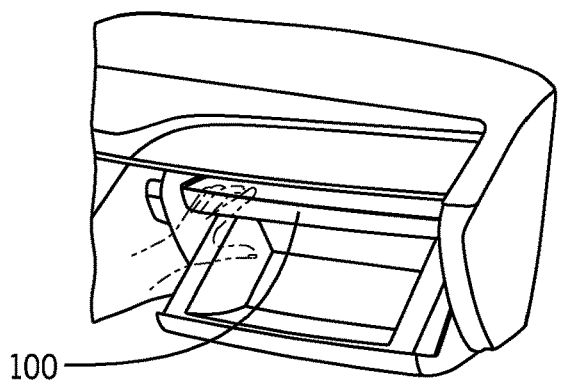
Figure 7E:
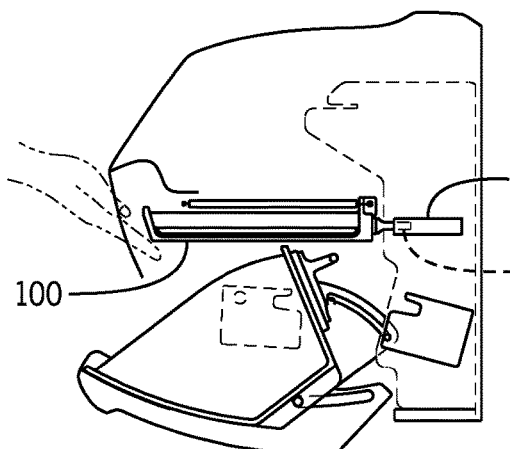

According to an exemplary embodiment as shown schematically in FIGS. 6E and 7E, in response to hand H releasing force from tray 100, spring 10 expands and provides a force to move or push tray 100 from the extended position to the intermediate position. As shown schematically in FIG. 7E, an external force may move tray 100 from the extended position through the intermediate position to the retracted position.

Figure 6F:
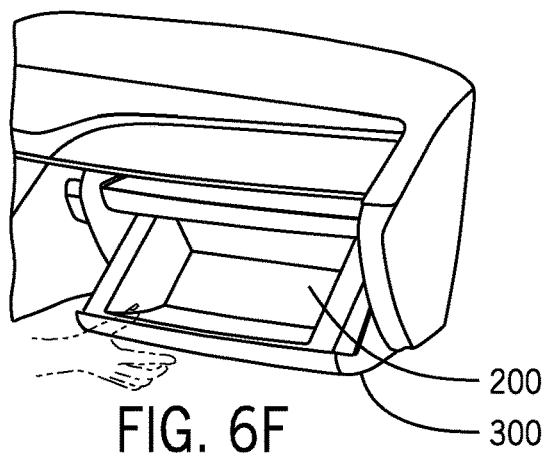
Figure 7F:
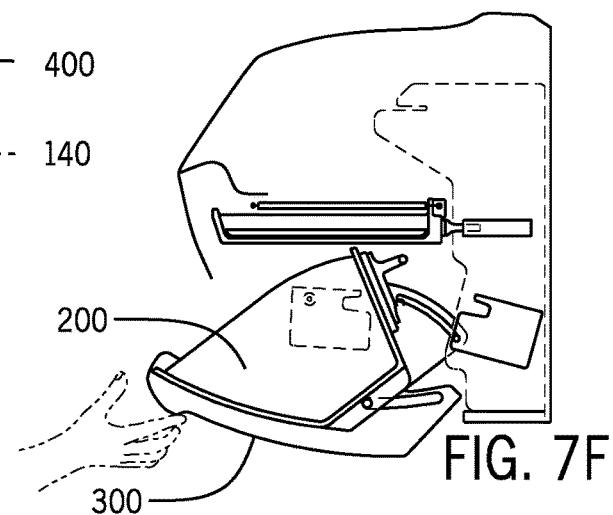

According to an exemplary embodiment as shown schematically in FIGS. 6F and 7F, hand H may provide a force to move or push bin 200 and/or cover 300 to move bin 200 from the open position to the closed position and to move cover 300 from the lowered position to the upward position.

According to an exemplary embodiment, latch assembly 400, latch assembly 500, latch assembly 600, button 2 and button 3 may be implemented as a mechanical assembly rather than implemented using mechatronic systems/modules. Mechanisms may connect button 2 and button 3 to a mechanical latch assembly 400, a mechanical latch assembly 500 and a mechanical latch assembly 600 to activate latches within latch assembly 400, latch assembly 500 and latch assembly 600.

According to an exemplary embodiment, latch assembly 400, latch assembly 500, latch assembly 600, button 2 and button 3 may be electrical or mechatronic. Wired or wireless connections may connect button 2 and button 3 to an electrical or mechatronic latch assembly 400, an electrical or mechatronic latch assembly 500 and an electrical or mechatronic latch assembly 600 to activate latches within electrical or mechatronic latch assembly 400, electrical or mechatronic latch assembly 500 and electrical or mechatronic latch assembly 600. Latch assembly 400, latch assembly 500 and latch assembly 600 may be magnetic, and releasing a magnetic latch may involve reversing a magnetic polarity. Button 2 and button 3 may be touch activated, digital or presented on a touch screen or a console screen.

According to an exemplary embodiment, button 2 and button 3 may comprise push latches. A first push latch may move cover 300 from the upward position to the lowered position and tray 100 from the retracted position to the intermediate position. The first push latch may be actuated by applying a force to cover 300. A second push latch may move bin 200 from the closed position to the open position. The second push latch may be actuated by applying a force to bin 200.

It is important to note that the present inventions (e.g. inventive concepts, etc.) have been described in the specification and/or illustrated in the FIGURES of the present patent document according to exemplary embodiments; the embodiments of the present inventions are presented by way of example only and are not intended as a limitation on the scope of the present inventions. The construction and/or arrangement of the elements of the inventive concepts embodied in the present inventions as described in the specification and/or illustrated in the FIGURES is illustrative only. Although exemplary embodiments of the present inventions have been described in detail in the present patent document, a person of ordinary skill in the art will readily appreciate that equivalents, modifications, variations, etc. of the subject matter of the exemplary embodiments and alternative embodiments are possible and contemplated as being within the scope of the present inventions; all such subject matter (e.g. modifications, variations, embodiments, combinations, equivalents, etc.) is intended to be included within the scope of the present inventions. It should also be noted that various/other modifications, variations, substitutions, equivalents, changes, omissions, etc. may be made in the configuration and/or arrangement of the exemplary embodiments (e.g. in concept, design, structure, apparatus, form, assembly, construction, means, function, system, process/method, steps, sequence of process/method steps, operation, operating conditions, performance, materials, composition, combination, etc.) without departing from the scope of the present inventions; all such subject matter (e.g. modifications, variations, embodiments, combinations, equivalents, etc.) is intended to be included within the scope of the present inventions. The scope of the present inventions is not intended to be limited to the subject matter (e.g. details, structure, functions, materials, acts, steps, sequence, system, result, etc.) described in the specification and/or illustrated in the FIGURES of the present patent document. It is contemplated that the claims of the present patent document will be construed properly to cover the complete scope of the subject matter of the present inventions (e.g. including any and all such modifications, variations, embodiments, combinations, equivalents, etc.); it is to be understood that the terminology used in the present patent document is for the purpose of providing a description of the subject matter of the exemplary embodiments rather than as a limitation on the scope of the present inventions.

It is also important to note that according to exemplary embodiments the present inventions may comprise conventional technology (e.g. as implemented and/or integrated in exemplary embodiments, modifications, variations, combinations, equivalents, etc.) or may comprise any other applicable technology (present and/or future) with suitability and/or capability to perform the functions and processes/operations described in the specification and/or illustrated in the FIGURES. All such technology (e.g. as implemented in embodiments, modifications, variations, combinations, equivalents, etc.) is considered to be within the scope of the present inventions of the present patent document.

What is claimed is:

1. A component for a vehicle interior configured to stow an article comprising:
    (a) a base;
    (b) a bin coupled to the base comprising a receptacle into which the article can be stowed and configured to move relative to the base in an opening direction from a closed position to an open position for access;
    (c) a tray coupled to the base and configured to move relative to the base from a retracted position to an intermediate position for access; and
    (d) a cover coupled to the base configured to move from an upward position to cover the tray to a lowered position to uncover the tray;
    wherein the bin is configured to move relative to the base from the closed position to the open position when the tray is in the retracted position and the intermediate position.

2. The component of claim 1 wherein the tray is configured to move from the retracted position to the intermediate position when the bin is in the closed position and the open position.

3. The component of claim 1 wherein the tray is configured to move relative to the base from the intermediate position to an extended position.

4. The component of claim 1 comprising a spring; wherein the spring is configured to move the tray from the extended position to the intermediate position.

5. The component of claim 1 wherein the tray is configured to move from the intermediate position to the extended position when the bin is in the closed position and the open position.

6. The component of claim 1 comprising a mechanism configured to (a) latch the tray to the base in the retracted position and (b) unlatch the tray from the base.

7. The component of claim 1 comprising a mechanism configured to (a) retain the bin in the closed position (b) guide movement of the bin from the closed position to the open position and (c) guide movement of the cover from the upward position to the lowered position.

8. The component of claim 1 comprising a mechanism configured to (a) retain the tray in the retracted position and (b) move the tray from the retracted position to the intermediate position.

9. A component for a vehicle interior configured to stow an article comprising:
    (a) a base;
    (b) a bin coupled to the base comprising a receptacle into which the article can be stowed and configured to move relative to the base in an opening direction from a closed position to an open position for access;
    (c) a tray coupled to the base and configured to move relative to the base from a retracted position to an intermediate position for access;
    (d) a cover coupled to the base configured to move from an upward position to cover the tray to a lowered position to uncover the tray; and
    (e) a mechanism;
    wherein the mechanism is configured to (1) retain the bin in the closed position (2) guide movement of the bin from the closed position to the open position and (3) guide movement of the cover from the upward position to the lowered position.

10. The component of claim 9 wherein the cover is coupled to the bin, and wherein the mechanism is configured to guide movement of the cover and the bin.

11. The component of claim 9 wherein the mechanism comprises (a) a latch configured to retain the bin in the closed position and (b) a gear and a rack configured to guide movement of the cover and the bin.

12. The component of claim 9 wherein the mechanism is configured to (a) retain the tray in the retracted position and (b) move the tray from the retracted position to the intermediate position.

13. The component of claim 12 wherein the mechanism comprises a latch configured to retain the tray in the retracted position and a spring configured to move the tray from the retracted position to the intermediate position.

14. The component of claim 12 wherein the mechanism is configured to guide movement of the cover from the upward position to the lowered position and then move the tray from the retracted position to the intermediate position.

15. The component of claim 9 wherein the mechanism comprises a latch configured to retain the cover in the upward position and a gear and a rack configured to guide movement of the cover from the upward position to the lowered position.

16. A component for a vehicle interior configured to stow an article comprising:
   (a) a base;
   (b) a bin coupled to the base comprising a receptacle into which the article can be stowed and configured to move relative to the base in an opening direction from a closed position to an open position for access;
   (c) a tray coupled to the base and configured to move relative to the base from a retracted position to an intermediate position for access;
   (d) a cover coupled to the base configured to move from an upward position to cover the tray to a lowered position to uncover the tray;
   (e) a first button; and
   (f) a second button.

17. The component of claim 16 wherein the first button is configured to (a) move the cover relative to the bin from the upward position to the lowered position to uncover the tray and (b) move the tray relative to the base from the retracted position to the intermediate position for access.

18. The component of claim 16 wherein the first button is configured to move the tray relative to the base from the retracted position to the intermediate position for access when the first button is pressed after the second button.

19. The component of claim 16 wherein the second button is configured to move the bin relative to the base from the closed position to the open position for access.

20. The component of claim 16 wherein the second button is configured to (a) move the cover from the upward position to the lowered position and (b) move the bin relative to the base from the closed position to the open position for access.

* * * * *